3,390,482
LAMINATED ARTICLE HAVING A TENSED CLOTH OUTER LAYER
John H. Holtvoigt, Tipp City, Ohio, assignor to The Dolly Toy Co., Tipp City, Ohio, a corporation of Ohio
Filed Oct. 30, 1964, Ser. No. 407,727
4 Claims. (Cl. 46—158)

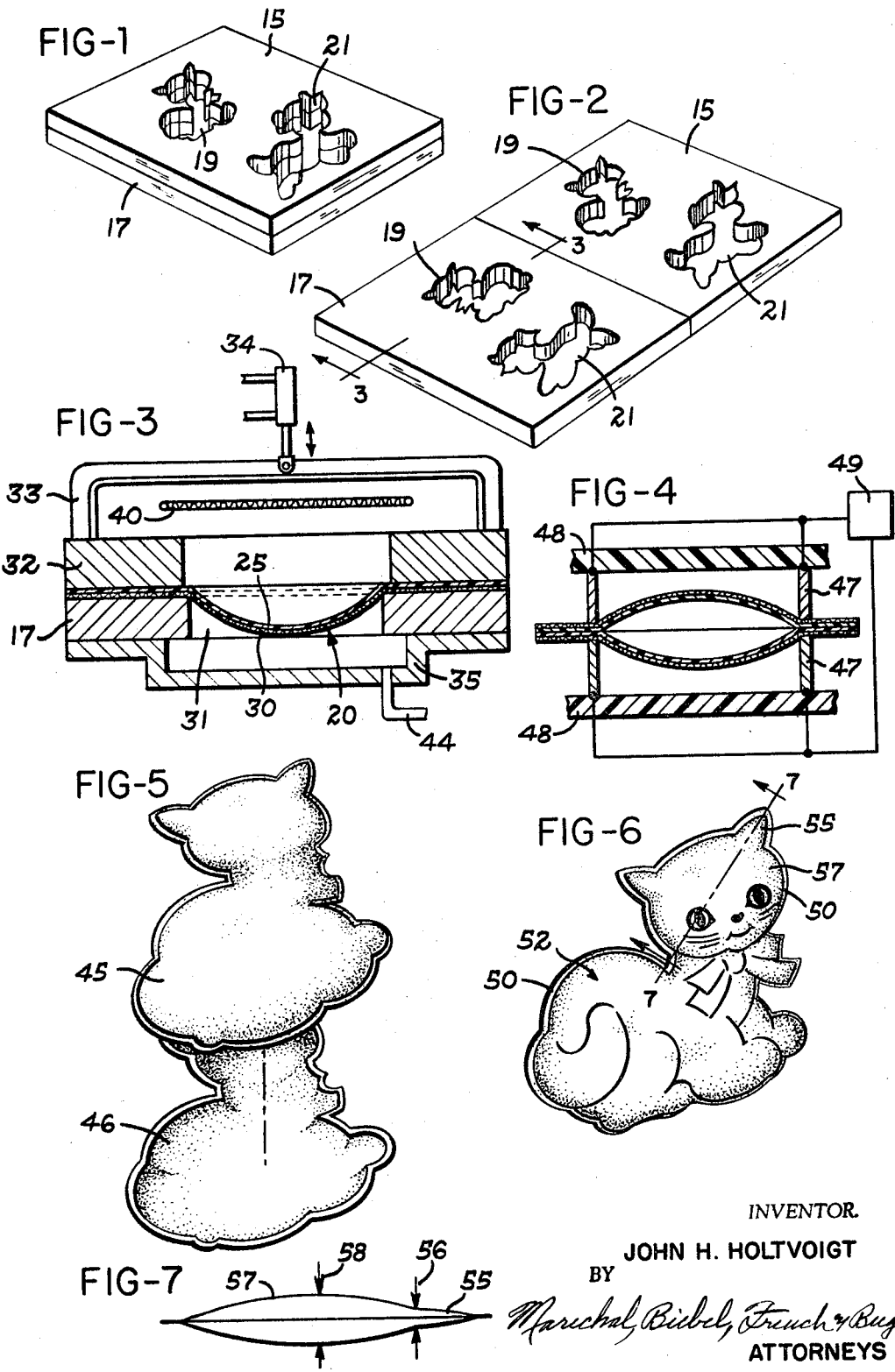

ABSTRACT OF THE DISCLOSURE

Hollow toys vacuum formed from a thermoplastic and cloth laminate in which left- and right-half images are free formed in a contour mold in which the curvature is formed by stretching the cloth, providing a three-dimensional effect in which the curvature of the article is permanently set with the cloth permanently in tension.

---

This invention relates to articles having a contoured cloth covered surface of sheet material.

The invention relates to contoured articles, such for example as toys, produced by pressure forming wherein the requirement for a mold having the continuous surface contour of the article is eliminated.

The contoured article can be made by vacuum forming in a die defined only by the article outline. Such die may be made by stacking and clamping together two or more flat dies, such as wooden blocks. On the flat surface of one die, the profile or outline of the desired figure is traced, and this figure is then cut out of the stacked dies to produce die pairs having identical cavities extending therethrough. By simply turning over half of the dies cut, mating pairs of dies are formed which describe complementary right and left profiles of the articles. These dies are then placed over or connected to a vacuum chamber. A sheet of thermoplastic material to which has been previously laminated a cloth or fabric-like material which has a limited or predetermined amount of stretch is placed over the die. The laminated sheet is clamped over the cavity with the cloth layer inside or adjacent the cavity, and with the thermoplastic layer exposed, so that it can be heated to make the sheet pliable.

The plastic sheet is heated and when it becomes sufficiently pliable for drawing, a vacuum is introduced in the chamber which results in the laminated sheet being forced by atmospheric pressure down into the cavity cut in the die. This results in controlled stretching of the cloth supporting the plastic material and forms in the sheet one half of a three-dimensional figure having a free-formed outer surface contour, since the sheet remains substantially unsupported within the area of the cavity during forming. The complementary figures thus formed may be joined together to form a cloth covered, hollow, lightweight article having the appearance, feel and texture of cloth, and having a smoothly contoured outer surface.

Another important object of this invention is the provision of a hollow cloth article of manufacture having the appearance and feel of a stuffed toy but without the use of any stuffing material.

As another object, the present invention produces a formed, hollow, three-dimensional article of manufacture having a cloth outer surface backed by a plastic inner surface and is characterized by a contoured free-formed appearance.

A still further object of this invention is the provision of an article of manufacture having the appearance and the texture of cloth and having smoothly contoured, free-formed surfaces which vary in depth in accordance with the proximity to an edge of the article.

Other objects and advantages of the invention will be apparent from the following description, the accompanying drawing and the appended claims.

In the drawing:

FIG. 1 is a perspective view of the inexpensive dies in a stacked relation after the figures are cut;

FIG. 2 is a perspective view of the right and left die shown side by side after they have been cut while in the assembled position shown in FIG. 1;

FIG. 3 is a sectional view showing a free-formed contour formed by this invention in a vacuum forming device and a die;

FIG. 4 is a typical sectional view of a pair of left and right sheets being joined together in a heat sealing device;

FIG. 5 is a perspective view of typical left- and right-hand sheets, with the contoured surfaces formed thereby shown by stippling;

FIG. 6 is a perspective view of the finished article of FIG. 5, and stippled to show the contoured surface; and FIG. 7 is a section taken generally along the line 7—7 of FIG. 6.

Referring to the figures of the drawing, which illustrate a preferred embodiment of the invention, a pair of dies 15 and 17 are shown in perspective in FIG. 1. They are constructed, for example, from a rigid material such as hard maple or walnut wood, or a pressed composition board. The right die plate is stacked upon the left die plate, and the two die plates are held together, such as by clamping, so that they may be handled as a unit. Upon the outside surface of one of the plates is traced the outline of the particular figures or articles which are to be formed. While only two figures are shown, it is to be understood that any number of figures could be traced depending upon the number of cavities which are desired. While the two dies are thus clamped together, the outlines of the traced figures are cut out as for example, by a jig saw, such as the cat 19 and the dog 21.

As shown in FIG. 2, by simply reversing the left die 17, in effect two dies are constructed, one forming a cavity having a right profile view of the figures, referred to as the right die 15, and the left die 17 which contains cavities of constant depth which describe the profile of the figures as viewed from the left or opposite side. While only two dies are shown for purposes of illustration, it is possible to make any number of right- and left-hand dies in a very economical manner simply by stacking any die plates on top of each other and sawing once around the profile view of each figure.

It is desirable to treat the wooden dies with a suitable sealant in order to prevent deterioration. Furthermore, if the profile edge of the figures becomes excessively worn, the dies may be interchanged so that the opposite side of each die is used.

The sheet material 20 which is to be pressure formed preferably consists of a laminate of thermoplastic sheet material 25 and cloth 30, or any other suitable flexible material forming a support for the thermoplastic sheet and characterized by a limited stretching ability. Preferably, the material 25 is previously laminated to the cloth 30, such as by a polyvinyl acetate. The cloth 30 or suitable cloth-like material may have any desired pattern printed thereon or woven therein, and typical materials may include gingham, percale, velour, calico, burlap, felt, or any other material providing a desired surface appearance, texture and limited stretch. Also, individual identifying characteristics of the end article may be previously formed within the cloth. This invention is not limited to the use of previously laminated cloth or supporting outer layer and plastic, and the cloth may be laminated to the plastic sheet during the drawing operation by any suitable heat-activated adhesive.

In FIG. 3, the step of vacuum forming is schematically shown with the use of the left die 17. The sheet 20 is placed in covering relationship to the cavity 31 in the left die 17 with the cloth 30 on the bottom or inner side. This laminated sheet is clamped firmly against the outer edge portion of the die 17 by a frame 32 which may be mounted for vertical clamping movement on the bracket 33 and an air cylinder 34. The frame may be rectangular when vacuum drawing large sheets over a multi-cavity die. However, preferably, the frame is provided with an opening following generally the shape of the article outline, to minimize the extent to which material 20 outwardly of the outline or periphery of the article is drawn into the cavity 31 during the forming process.

The die 17 and the sheet of cloth-plastic laminate 20 are placed on top of a vacuum chamber 35 and are held tightly to the chamber by the piston of the air cylinder 34 pressing down on the frame 32. Means for heating the plastic sheet prior to drawing as shown in FIG. 3 may be a conventional heating coil 40 positioned overhead to direct radiant heat onto the thermoplastic side of the laminated sheet material until the plastic becomes somewhat soft and pliable. Of course, hot air, hot liquid, infra red radiation, or other forms of heat may be employed.

A partial vacuum is then introduced in the line 44 creating a decrease in pressure within the chamber 35 and the mold cavity 31. Due to the differential pressure, the combined layers of thermoplastic material and cloth material are forced down into the cavity in varying degrees according to the proximity to the peripheral edges of the cavity, resulting in a free-formed contour over the surface of the article. The warp and woof threads are placed in tension. After the sheet has cooled and set, the frame 32 is released and retracted by the cylinder 34. The fabric remains in tension.

The extent of the deformation of the materials into the mold cavity 31 depends upon a number of factors, including the type of outer supporting or cloth material 30 which is used and its stretching characteristics, and the amount of partial vacuum which is introduced within the chamber 35. The molded half of the article which is thus formed is unsupported by any contoured mold wall. It is essentially free-formed and assumes a natural, life-like curvature which is both realistic and pleasing. It is ideally suited for the formation of toy animals, trees, flowers and the like having a soft, stuffed toy feel and appearance.

After both sides of the figures are vacuum formed in the above described manner illustrated by the front side 45 and the rear side 46 of FIG. 5, the two sides or halves of the two figures may be placed together, as shown in FIG. 4, so that the thermoplastic sheets are adjacent each other. The combined figures are then heat sealed together around the common peripheral edge by suitable apparatus, as for example, the induction heating electrode bands 47 shown in FIG. 4. These electrode bands 47 may be formed as mating pairs from a brass material in the shape of the profile outline of the figures, in a manner similar to that used for constructing steel rule dies. The bands are secured to the electrically insulated plates 48 and are adapted to receive a high frequency induction current from a suitable power source 49, for subjecting the peripheral edges of the halves 45 and 46 to a heat sufficient to bond or seal the same together.

After the two vacuum formed sides of the figures are heat sealed together, the figure is trimmed around the profile of the figure so that a seal portion 50 remains around the periphery of the figure such as is shown around the cat 52 in FIG. 6.

The resulting figures and articles produced by the above described process provide a pleasant, three-dimensional appearance with a desired texture of cloth feel. Due to the permanent set which is taken by the plastic-cloth laminant after it is cooled, the puffed-up figures may be pinched together but will snap back to their original shape, which provides a significantly durable product. This is due, at least in part, to the fact that the fibers of the cloth remain in tension following vacuum forming, and contribute to the strength of the article.

While thus far the disclosure has been primarily concerned with the process for constructing figures, such as hollow toy animals, where both sides are exposed and which are ideally suited for suspending from a piece of string as a mobile for infants, it is not necessary that the two sides of the figure be heat sealed together. Instead, one of the formed sides of the figure is ideally suited for decorating a flat surface, for example, as an applique on the side of a baby crib or on a curtain.

It is therefore apparent from the above description, that the present invention provides simple and economical articles of form and depth and which can be covered with colorful fabrics which will produce, for example, a gingham dog, a calico cat or any other legendary character from children's story books. As another example, the articles which are inexpensively produced by the above process can be used for interior decorating such as to provide the effect of three-dimensional natural flowers.

The article of manufacture of this invention may thus consist of a child's hollow toy which has the appearance, the feel and the flexibility of a stuffed toy but without the use of any stuffing material. Accordingly, plush fabrics such as velour may be used as the outer cloth material 30 laminated or suitably bonded to thin polyvinyl plastic sheet material 25, which for example, may be 7.5 mil material. Velveteens, or other pile fabrics may also be used, according to the desired surface characteristics of the finished article. The opposed left and right vacuum or differential pressure formed sheets of the articles are thus joined along a common peripheral edge with the plastic material of each of the sheets being fused together along such peripheral edge with the outer cloth surface exposed, leaving an entrapped and enclosed air space between the sheets.

Referring to FIG. 7, it will be seen that the surface contour, which is free-formed has, at any given point, a depth from the original plane of the sheet which is roughly proportional to the proximity of the point of the nearest peripheral edge of the article. In the illustration of FIGS. 6 and 7, the ear 55, being of relatively narrow width, assumes a relatively shallow depth 56 while the head 57, being of greater width, takes on a proportionately greater depth 58. A life-like and realistic three-dimension appearance is thus attained with a die in which is formed only the outline of the article. By the use of an appropriate textile or cloth as a support for the plastic sheet 25, an article may thus be formed which has the surface contour, the appearance, and generally the feel of a stuffed toy or stuffed animal without the use of stuffing and at considerably reduced investments in labor and materials.

While the above-described process is particularly suited for inexpensively producing articles with a wide variety of surface contours and outlines, the process is also particularly adapted for the production of contoured molds, such as for long production runs of a single article. Accordingly, the process is useful in the production of a first article which then may be employed as the pattern from which a poured mold may be made. Thus, a sheet drawn from the patterns 15 and 17 of FIG. 2 will have left and right images formed therein and which may then be used by a pattern maker directly to form a plaster cast of the outline and surface contour of the article in making a metal mold. This has the advantage of not only providing a pattern but also of automatically forming the parting plane between the halves of the pattern. Accordingly, contoured molds may be inexpensively produced which have accurately controlled depth and which may be used in normal vacuum forming apparatus eliminating the necessity of hand carving or otherwise tediously forming an initial pattern, the halves of the pattern being formed by the free-forming process described above, resulting in a drawn sheet which has free-formed surface contour characteristics.

What is claimed is:

1. An article of manufacture comprising a pair of joined together left and right three-dimensional sheets of cloth-plastic laminate comprising an outer surface woven of cloth having limited stretching characteristics and having an inner layer of thermoplastic sheet material, each of said left and right sheets having complementary outer cloth surfaces with the cloth permanently in tension, said surfaces having complementary preset contours varying in their spaced apart relation in accordance with the proximity to a joined together portion of said sheets, and said sheets being peripherally bonded together at mutually cooperating peripheral edges forming a unitary three-dimensional article.

2. The article of claim 1 wherein said peripheral edges are formed with cooperating outwardly extending flanges with their inner thermoplastic surfaces being heat-sealed together.

3. A child's hollow toy comprising opposed sheets of thermoplastic material and cloth laminate each having expanded therein permanent complementary surface contours of one half of said toy and joined together along a coplanar common periphery with the plastic material along the peripheral edges of each of said sheets joined together and with the cloth exposed in a permanently in tension condition to form the outer surface of said toy with an encloser pressurized air space therebetween presenting an outer compressible and resilient surface which has the contour and the feel of a stuffed toy.

4. A child's hollow toy having the appearance and feel of a stuffed cloth toy and formed without stuffing comprising a pair of sheets each being formed of an inner layer of thermoplastic material bonded to an outer layer of cloth, each of said sheets having formed therein complementary respective left and right images of said toy with said images being permanently pressure set therein leaving the said outer cloth layer thereof permanently in tension, and said sheets having complementary peripheral edges fused together with the cloth layers thereof exposed on the outer surface and forming an enclosed air space therebetween.

References Cited

UNITED STATES PATENTS

| | | | |
|---|---|---|---|
| 1,535,354 | 4/1925 | Steele et al. | 156—292 X |
| 1,654,647 | 1/1928 | Heist | 156—292 X |
| 1,920,961 | 8/1933 | Anderson | 156—292 |
| 2,210,024 | 8/1940 | Cayo | 273—58.4 X |
| 2,633,665 | 4/1953 | Kwasnik et al. | 46—158 X |

FOREIGN PATENTS 543,963  3/1942  Great Britain.

F. BARRY SHAY, *Primary Examiner.*

UNITED STATES PATENT OFFICE
CERTIFICATE OF CORRECTION

Patent No. 3,390,482                                             July 2, 1968

John H. Holtvoigt

It is certified that error appears in the above identified patent and that said Letters Patent are hereby corrected as shown below:

Column 2, lines 45 and 46, "and die plates" should read -- the die plates --. Column 6, line 3, "encloser pressurized" should read -- enclosed unpressurized --.

Signed and sealed this 16th day of December 1969.

(SEAL)
Attest:

Edward M. Fletcher, Jr.                          WILLIAM E. SCHUYLER, JR.
Attesting Officer                                     Commissioner of Patents